United States Patent
Yao

(10) Patent No.: US 7,130,201 B2
(45) Date of Patent: Oct. 31, 2006

(54) POWER SUPPLY DEVICE FOR OUTPUTTING STABLE PROGRAMMABLE POWER SUPPLY

(75) Inventor: Pei-Chih Yao, Taipei (TW)

(73) Assignee: Grand Power Sources Inc., Taipei (TW)

( * ) Notice: Subject to any disclaimer, the term of this patent is extended or adjusted under 35 U.S.C. 154(b) by 274 days.

(21) Appl. No.: 10/845,085

(22) Filed: May 14, 2004

(65) Prior Publication Data
US 2005/0254274 A1    Nov. 17, 2005

(51) Int. Cl.
*H02M 3/335* (2006.01)
*H02H 7/10* (2006.01)
*H02H 7/00* (2006.01)

(52) U.S. Cl. ............... 363/21.04; 363/21.05; 363/21.07; 363/21.1; 363/56.11

(58) Field of Classification Search .......... 363/20, 363/21.01, 21.02, 21.04, 21.05, 21.07, 21.1, 363/21.11, 50, 55, 56.01, 56.09, 56.1, 56.11
See application file for complete search history.

(56) References Cited

U.S. PATENT DOCUMENTS

| | | | | |
|---|---|---|---|---|
| 4,642,743 A | * | 2/1987 | Radcliffe | 363/21.07 |
| 5,936,853 A | * | 8/1999 | Mweene | 363/44 |
| 6,278,621 B1 | * | 8/2001 | Xia et al. | 363/21.06 |
| 6,452,818 B1 | * | 9/2002 | Simopoulos | 363/21.06 |
| 6,574,122 B1 | * | 6/2003 | Morita et al. | 363/21.01 |
| 6,882,548 B1 | * | 4/2005 | Jacobs et al. | 363/21.06 |

* cited by examiner

*Primary Examiner*—Matthew V. Nguyen
(74) *Attorney, Agent, or Firm*—Bacon & Thomas, PLLC

(57) ABSTRACT

The present invention discloses a power supply device for outputting a stable programmable power supply, which comprises a transformer disposed at a DC output end of the power supply device, and a clamp circuit connected to a secondary current of the transformer. Since the clamp circuit is disposed on the secondary current of the transformer, therefore it does not require a high DC voltage to drive the clamp circuit. The clamp circuit can release the high voltage produced when the metal oxide semiconductor field effect transistor (MOSFET) is off, and thus reducing the high voltage borne by the MOSFET to enhance the reliability of the MOSFET. Additionally, the present invention can prevent the transformer from being saturated due to magnetic leakage, inductance, and stored energies released or eliminated from the transformer.

4 Claims, 5 Drawing Sheets

POWER SUPPLY DEVICE FOR OUTPUTTING STABLE PROGRAMMABLE POWER SUPPLY

FIELD OF THE INVENTION

The present invention relates to a power supply device for outputting a stable programmable power supply, more particularly to a power supply device using a clamp circuit connected to the secondary current of a transformer, such that when the metal oxide semiconductor field effect transistor (MOSFET) is off, a high voltage can be released through the clamp circuit, and thus lowering the high voltage borne by the MOSFET and enhancing the reliability of the MOSFET.

BACKGROUND OF THE INVENTION

In general, a switching power supply is extensively used for providing power supply. Most of the traditional power supply devices are linear power supply devices, which are usually used for an instrument providing a constant voltage and a constant current, which has a low ripple noise, a low EMI, a good modulation, and an easy-to-control features. Although the linear power supply device is popular, yet it still has certain shortcomings including a large power loss and a low power efficiency. Further, since the volume of the power supply device used for the instrument is large and inefficient, therefore it is a trend of using a switching-mode technique for the manufacture of the power supply device for instruments, and such technology is used to provide a power density and a power efficiency.

Please refer to FIG. 1 for the traditional switching power supply, which uses the repeated changes of electric connections and cutoffs of a circuit to switch a DC voltage to a specific frequency after the voltage is rectified and filtered. The result is filtered to obtain a fixed output voltage, instead of a voltage output not changing according to a programmable control.

Generally speaking, a switching power supply is a high frequency electronic device with an operating frequency ranging from 20 KHz to 200 KHz. In a system circuit, its power switch such as a MOSFET generally uses a transistor working in a saturation and cutoff area. However, the traditional linear power supply device generally uses a transistor working in a linear area and using it as a rheostat to modulate unstable input voltages. In this type of circuit, the passive component must bear a current that varies with its loading. Once there is a change to the input voltage or a sudden increase to the loading, then the power consumed by the passive component will change or increase accordingly. Therefore, the total system power loss will be increased, and the efficiency will drop. However, the switching power supply does not work completely in the linear area. Therefore, even the range of changes to the input voltage and the loading is very large, an efficiency higher than that of a linear power supply can be obtained.

Please refer to FIG. 2 for a flyback power supply circuit. Since its transformer also acts as an inductor for outputting stored energy, and the secondary terminal just needs a diode, and the C1 is mainly used for modulating the power factor of the power supply device.

Further, the power stage comprised of a pulse width modulation (PWM) IC, Q1, and T1 mainly uses the PWM IC to control the electric connection of the electronic switch of the transistor Q1. With the diode D1 and the capacitor C0 of the secondary current, a DC voltage output is obtained. However, when the transistor Q1 is electrically connected, the primary current of the transformer T1 will have a primary current to pass through. Since the polarities of the primary and secondary currents of the transformer are opposite, the diode D1 will have a reverse bias voltage, and thus will not output any power, and is unable to have any feedback to the circuit to control the ON/OFF cycle of the PWM IC. Since the current is stored in the transformer T1, the transformer T1 will be worn out tremendously.

In view of the shortcomings of the above-mentioned traditional linear power supply device that once there is a change to the input voltage or a sudden increase to the loading, the power consumed by the passive component will change or increase accordingly, thus increasing the overall system power loss and lowering the efficiency accordingly, the inventor of the present invention based on years of experience on the manufacture and technological development of power supply devices to perform extensive researches, developments, and experiments, and finally invented a power supply device for outputting a stable power supply in accordance with the present invention.

In addition, although the primary terminal of the transformer is connected to a clamp circuit (comprised of D2 and D3) for clamping the voltage of the passing current, it still results in a lower efficiency than the original efficiency since the voltage of the primary current is higher. Furthermore, D2 and D3 must be a high voltage resisting diode, and its cost is higher than that of the general diodes.

Please refer to FIG. 3 for a forward power supply circuit. Its main difference from the flyback circuit resides on that the forward power supply circuit additionally uses a Schottky diode and an inductor at the secondary section of the power stage. When Q1 is cut off, the voltage polarity of the current isolated from the transformer is reversed, so that the voltage of the D2 diode becomes a reverse bias voltage and not electrically connected. However, the D3 diode is electrically connected. Then, the energy at the loading end is supplied by the energy stored in L0 and C0 via D3. Therefore, in the topology of the forward circuit, the L0 and C0 are also energy storage components besides acting as a low pass filter. The components adopted by the forward circuit are similar to those used by the flyback circuit, but since the reverse bias voltage from the Ti One Aspect Circuit is accumulated with the output voltage of C0 to double the output voltage when the Q2 transistor is turned off, therefore the voltage resistance of Q1 must be at least 800V. Although the forward circuit can reduce the primary and secondary current passing through the transformer which can reduce the copper loss of the transformer, the transformer adds a third coil and thus increases the cost.

SUMMARY OF THE INVENTION

In view of the shortcomings of the above-mentioned traditional linear power supply device that once there is a change to the input voltage or a sudden increase to the loading, the power consumed by the passive component will change or increase accordingly, thus increasing the overall system power loss and lowering the efficiency accordingly, the inventor of the present invention based on years of experience on the manufacture and technological development of power supply devices to perform extensive researches, developments, and experiments, and finally invented a power supply device for outputting a stable power supply in accordance with the present invention.

The primary objective of the present invention is to provide a power supply device for outputting a stable power supply, which comprises a clamp circuit connected to the Another Aspect Circuit of the transformer of the power supply device for releasing a high voltage produced when the MOSFET is off and the energy produced by the magnetic leakage and the inductance and then stored in the transformer in order to lower the high voltage borne by the MOSFET and enhance the reliability of the MOSFET.

Another objective of the present invention is to provide a power supply device for outputting a stable power supply, which comprises a differential programmable IC disposed at a DC output end for comparing the output voltage at the DC output end with a preset voltage/time by the comparison function of the differential programmable IC, and the difference of the comparison is sent to a pulse width modulator by an opto coupler, so that the pulse width modulator controls the ON/OFF loading cycle of a MOSFET disposed at the input terminal of the power supply device according to the difference of the comparison, and the current ON/OFF time of the input power supply of a One Aspect Circuit passing into a transformer of the power supply device is modulated, and a stable programmable controlled output of current is provides at the DC output terminal of the power supply device.

A further objective of the present invention is to provide a power supply device for outputting a stable power supply, which comprises a voltage divider circuit connected to a DC power supply of a rectify/filter circuit disposed at the input terminal of the power supply device, and the voltage divider circuit is also connected to an input terminal of an IC of the pulse width modulator, so that if an over voltage (OVRV) exceeds a predetermined value due to an excessively high AC power supply, the OVRV will turn off the MOSFET to protect the power supply device and avoid damages caused by the high voltage. In the same time, the present invention will also provide a bias voltage circuit for the primary driver circuit of the transformer.

Another objective of the present invention is to provide a power supply device for outputting a stable power supply, which comprises a buffer circuit connected to the MOSFET, and the buffer circuit can prevent the high voltage of a pulse caused by the reverse direction of the primary voltage of the transformer when the transformer turns off the MOSFET to pierce through or damage the MOSFET. Therefore, the charging by a capacitor can slow down the instant change of voltage. If the MOSFET is turned ON, then the diode is substantially in a forward bias voltage, and the capacitor is discharged to consume the power of the pulse current to protect the MOSFET and reduce the generation of electromagnetic interference signals.

DETAILED DESCRIPTION OF THE PREFERRED EMBODIMENTS

Figure 1:
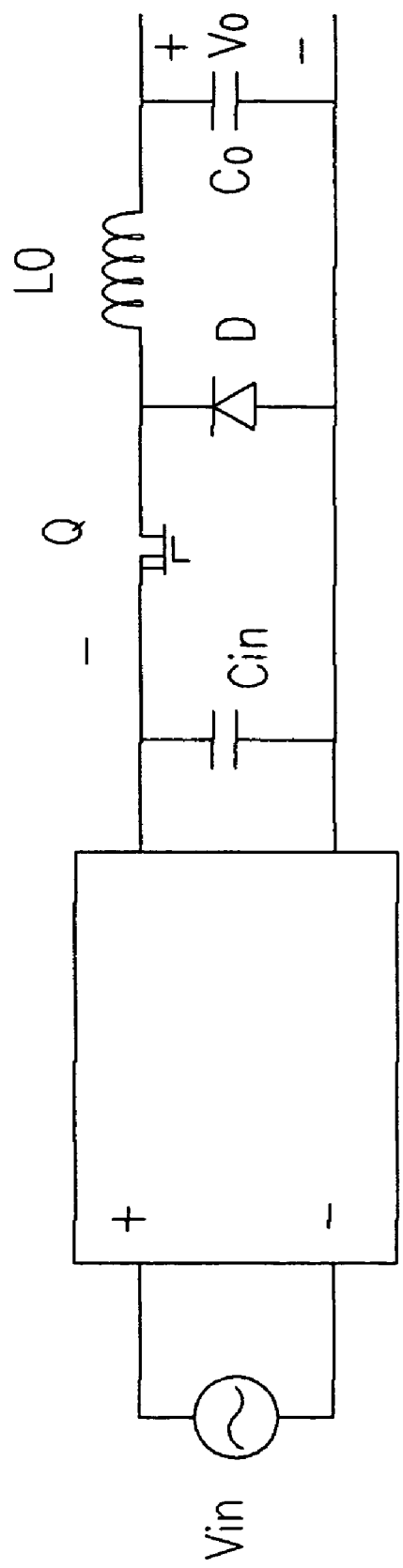
FIG. 1 is a circuit block diagram of a prior art.

To make it easier for our examiner to understand the objective of the invention, its structure, innovative features, and performance, we use a preferred embodiment together with the attached drawings for the detailed description of the invention.

The present invention discloses a power supply device for outputting a stable programmable power supply. Please refer to FIGS. 2 and 3. The power supply device 20 comprises a rectify/filter circuit 21, a transformer 22, a secondary filter circuit 23, and a DC output terminal 24; wherein the rectify/filter circuit 21 is connected to an AC power supply 31, and a capacitor C2 and an inductor L1 constitute a full wave rectify circuit for rectifying and filtering the AC power supply 31 to obtain a more stable DC power supply, and the transformer 22 is connected to a rectify/filter circuit 21 for rectifying and filtering and lowering the voltage of the AC power supply modulated by the programmable switching circuit. After a secondary filter made by a secondary filter circuit, the DC power supply is outputted from the DC output terminal 24.

Figure 4:
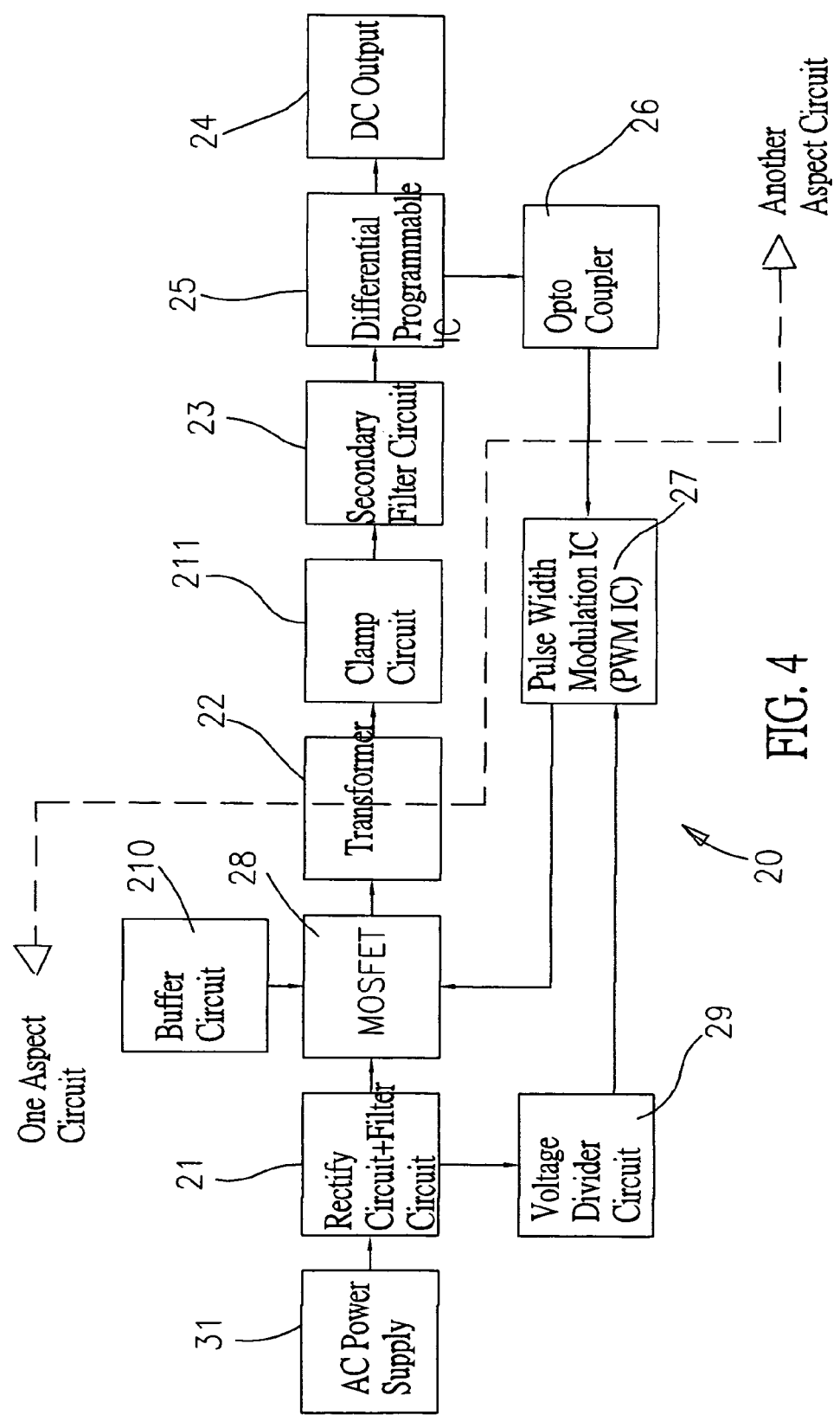
FIG. 4 is a circuit block diagram of the present invention.
Figure 5:
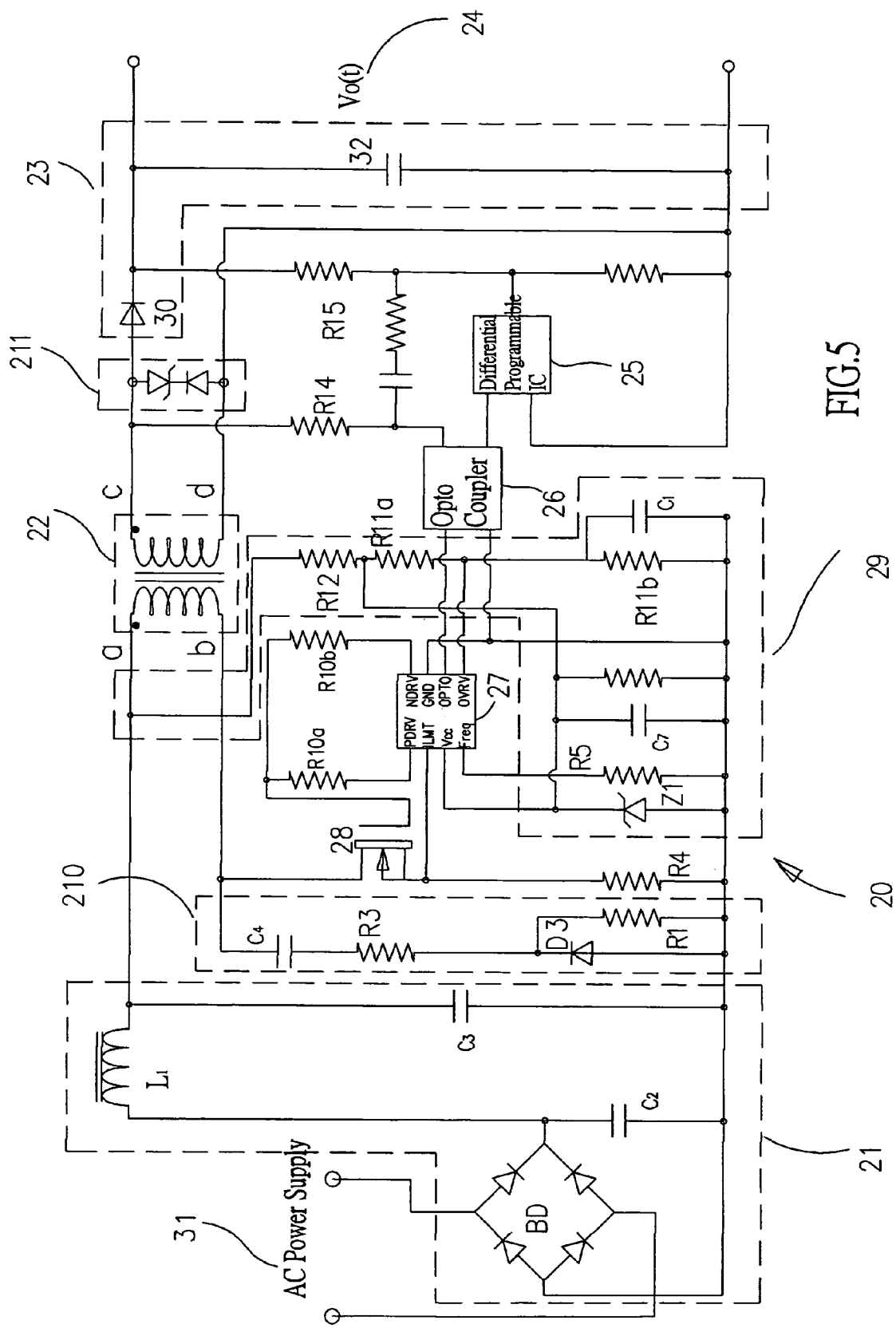
FIG. 5 is a circuit diagram of the present invention.

Further, please refer to FIGS. 4 and 5. A differential programmable IC 25 is disposed between the DC terminal 24 of the power supply device 20 and the secondary filter circuit 23, so that the comparison function of a differential programmable IC 25 is used to compare the output voltage of the DC output terminal with a predetermined voltage/time programmable control, and the difference after the comparison is sent to a pulse width modulation IC (PWM IC) 27. The PWM IC 27 controls the waveform loading cycle of a metal oxide semiconductor field effect transistor (MOSFET) 28 disposed between the rectify/filter circuit 21 and the transformer 22 according to such difference, and modulates the ratio of ON-OFF current of the primary input power of the transformer 22 and further provide a constant voltage output from the DC output terminal 24 of the power supply device 20.

Please refer to FIGS. 4 and 5 again. In the invention, the power supply device 20 comprises a voltage divider circuit 29, and the voltage divider circuit 29 is connected to a rectify/filter circuit 21 at the output terminal of the power supply device 20. The voltage divider circuit 29 is connected to an over voltage (OVRV) terminal of a pulse width modulation IC 27, and the voltage divider circuit 29 sends the DC voltage of the rectify/filter circuit 21 to the PWM IC 27, such that when the OVRV voltage occurs due to an excessively high voltage and the rectified DC voltage exceeds a predetermined value, the OVRV turns off the MOSFET 29 to protect the power supply device 20 from being damaged by the high voltage.

Please refer to FIGS. 4 and 5 again. In the invention, the power supply device 20 comprises a buffer circuit 210 comprised of a capacitor C4, a resistor R3, R1, and a diode D3. The buffer circuit 210 is connected to the MOSFET 28, and can prevent a surge and a high voltage caused by the reverse direction of the voltage when the transformer 22 turns off the MOSFET 28. When the MOSFET 28 is turned off, the diode D3 is in reverse bias voltage to charge a high voltage pulse produced by the One Aspect Circuit 26b of the transformer 22 by a capacitor C4 to absorb such purge. When the MOSFET 28 is turned on, the diode D3 is in the forward bias voltage and discharges the capacitor C4 to consume the power of the surge and protect the MOSFET 28 and reduce the generation of electromagnetic interference signals.

Please refer to FIGS. 4 and 5 again. In the invention, the power supply device 20 comprises a clamp circuit 211. With the connection to a magnetic circuit of the transformer 22, the clamp circuit 211 is connected to the Another Aspect Circuit of the transformer, so that the clamp circuit 211 can release the high voltage produced when the MOSFET 28 is turned off and the energy produced by a magnetic leakage and an inductance of the transformer 22 and then stored in the transformer 22, and thus lowering the high voltage borne by the MOSFET 28 and enhancing the reliability of the MOSFET 28.

Please refer to FIGS. 4 and 5. In the invention, the clamp circuit 211 releases energy by converting the reverse bias voltage of a diode into a forward bias voltage when the MOSFET 28 is turned off. The Zener diode is in reverse bias voltage, such that the Zener diode can discharge itself to release and eliminate the energy when the power exceeds a normal rated reference reverse voltage, and also can prevent the saturation of the transformer 22.

Please refer to FIGS. 4 and 5. In the invention, the primary terminal a of the transformer 22 is connected to the positive terminal at the rear of the rectify/filter circuit 21, and the rectified negative terminal is connected to the common ground terminal.

Please refer to FIGS. 4 and 5. In the invention, the secondary terminal of the transformer 22 is connected to a secondary filter circuit 23, and the secondary filter circuit 23 comprises a diode 30 and a filter capacitor 32.

Figure 2:
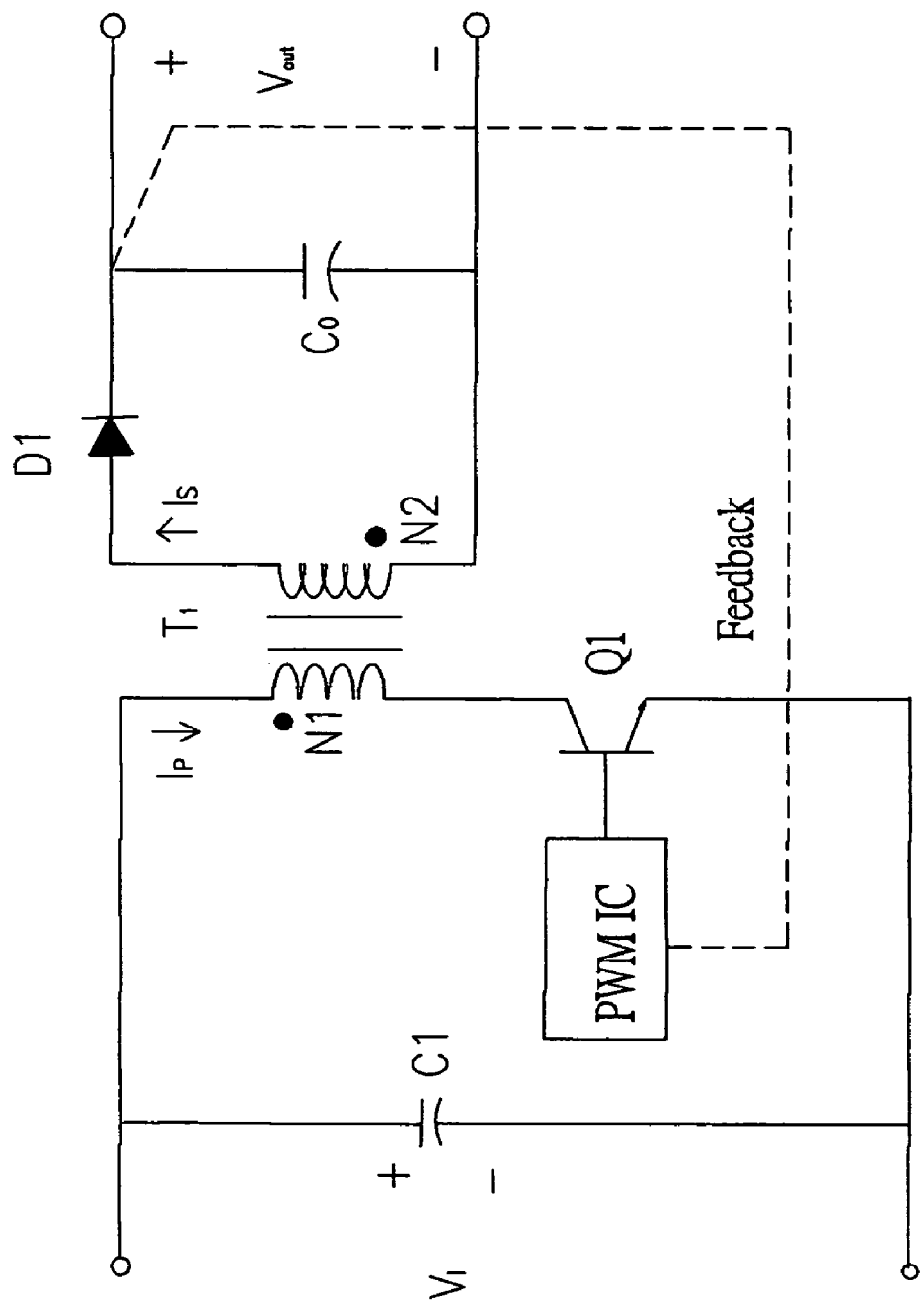
FIG. 2 is a schematic circuit diagram of a prior-art flyback power supply circuit.
Figure 3:
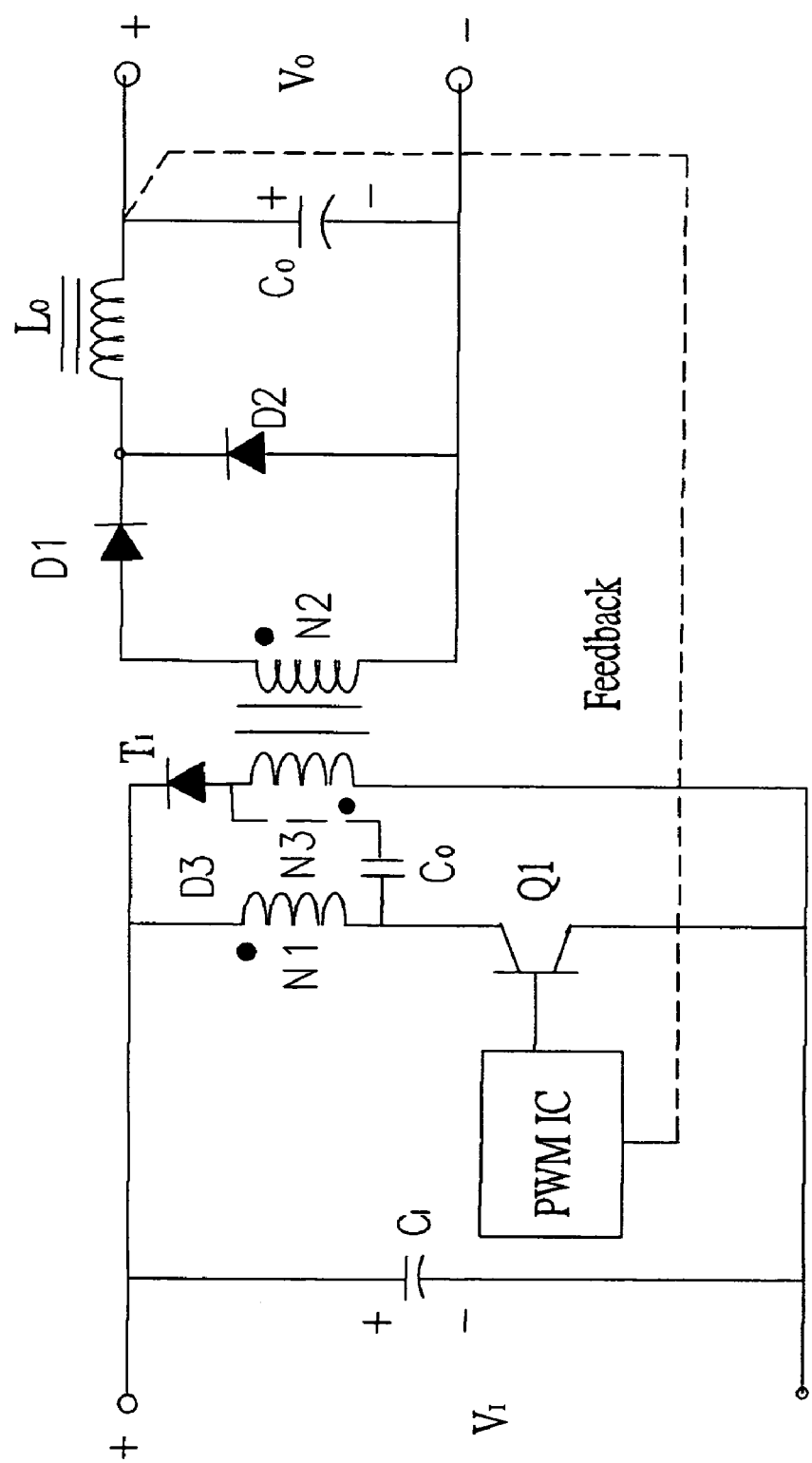
FIG. 3 is a schematic circuit diagram of a prior art forward power supply circuit.

Please refer to FIGS. 2 and 3. In the invention, the electric driving power of the PWM IC 27 is supplied by lowering and stabilizing the voltage of the circuit, resistor R12, capacitor C7, and Zener diode Z1 via the rectify/filter circuit 21 to keep the voltage of the electric driving power inputted by the PWM IC 27 constant and steady.

Please refer to FIGS. 4 and 5 again. In the invention, the frequency of the PWM IC 27 is fixed by a resistor R5. Please refer to FIGS. 4 and 5 again. In the invention, the over voltage of the input AC voltage is protected by a voltage divider circuit comprised of a resistor R11, a capacitor C1, and a resistor R12, and controlled by the voltage at the contact points of the resistors R11a, R11b connected to the OVRV of the pulse width modulation IC 27. If the OVRV voltage exceeds a predetermined value due to an excessively high AC power supply 31, the OVRV will turn off the MOSFET 28 to protect the power supply device 20.

Please refer to FIGS. 4 and 5. In the invention, the PDRV and NDRV at the PWM IC 27 controls the ascending and descending slopes of the ON and OFF voltage waveform of the PWM IC 27 by a resistor R10a, R10b, and the signal of the PWM IC 27 is outputted to a gate of the MOSFET 28, so that the current passing from a source to a drain and a One Aspect Circuit of the transformer 22 is controlled by the voltage signal of the gate.

Please refer to FIGS. 2 and 3. In the invention, the bias voltage produced by the current of the MOSFET 28 passing through a resistor R4 is outputted to a current detection terminal ILMT of the PWM IC 27. A predetermined value for an allowable voltage is set by the ILMT to provide an over voltage function for the PWM IC 27 to prevent the MOSFET 28 and the transformer 22 from being over loaded by electric current.

Please refer to FIGS. 2 and 3. In the invention, the transformer 22 is a toroidal transformer which has the advantages of increasing magnetic power conversion rate and reducing magnetic leakage.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device for outputting stable programmable power supply, comprising a rectify/filter circuit, a transformer, a secondary filter circuit, and a DC output terminal;

said rectify/filter circuit being coupled to an AC power supply and comprised of a capacitor and an inductor to constitute a full wave rectify circuit for rectifying and filtering said AC power supply to obtain a stable DC power supply, and said transformer being coupled to said rectify/filter circuit to reduce the voltage of said DC power supply after being rectified and filtered, and to output a direct current from said DC output terminal after a secondary filter by said secondary filter circuit;

wherein said power supply device comprises a clamp circuit, and said clamp circuit is coupled to a Another Aspect Circuit of said transformer, such that said clamp circuit reduces a high voltage produced when a MOSFET is turned off and releases energy of said transformer caused by a magnetic leakage and an induction and then stored in said transformer, thereby reducing the high voltage borne by said MOSFET and enhancing the reliability of said MOSFET; and wherein said clamp circuit releases energies by converting an original reverse bias voltage into a forward bias voltage when the MOSFET is turned off, so that said clamp circuit by itself releases and eliminates the energy if the voltage exceeds a referenced normal rated reverse voltage and a Zener diode is also set to a reverse bias voltage to prevent said transformer from being saturated.

2. A power supply device for outputting stable programmable power supply, comprising a rectify/filter circuit, a transformer, a secondary filter circuit, and a DC output terminal;

said rectify/filter circuit being coupled to an AC power supply and comprised of a capacitor and an inductor to constitute a full wave rectify circuit for rectifying and filtering said AC power supply to obtain a stable DC power supply, and said transformer being coupled to said rectify/filter circuit to reduce the voltage of said DC power supply after being rectified and filtered, and to output a direct current from said DC output terminal after a secondary filter by said secondary filter circuit;

wherein said power supply device comprises a clamp circuit, and said clamp circuit is coupled to a Another Aspect Circuit of said transformer, such that said clamp circuit reduces a high voltage produced when a MOSFET is turned off and releases energy of said transformer caused by a magnetic leakage and an induction and then stored in said transformer, thereby reducing the high voltage borne by said MOSFET and enhancing the reliability of said MOSFET; and further comprising a differential programmable IC disposed between a DC terminal of said power supply device and said secondary filter circuit, such that an output voltage of said DC output terminal is compared with a predetermined voltage/time comparison by a comparison function of a pulse width modulation (PWM) IC, and a difference after said comparison is sent to said PWM IC to control a waveform loading cycle of said MOSFET disposed between said rectify/filter circuit and said transformer according to said difference and modulate the current of said input power supply passing into said Another Aspect Circuit of said transformer, and further output a constant voltage for said DC output end of said power supply device.

3. A power supply device for outputting stable programmable power supply, comprising a rectify/filter circuit, a transformer, a secondary filter circuit, and a DC output terminal;

said rectify/filter circuit being coupled to an AC power supply and comprised of a capacitor and an inductor to constitute a full wave rectify circuit for rectifying and filtering said AC power supply to obtain a stable DC power supply, and said transformer being coupled to said rectify/filter circuit to reduce the voltage of said DC power supply after being rectified and filtered, and to output a direct current from said DC output terminal after a secondary filter by said secondary filter circuit;

wherein said power supply device comprises a clamp circuit, and said clamp circuit is coupled to a Another Aspect Circuit of said transformer, such that said clamp circuit reduces a high voltage produced when a MOSFET is turned off and releases energy of said transformer caused by a magnetic leakage and an induction and then stored in said transformer, thereby reducing the high voltage borne by said MOSFET and enhancing the reliability of said MOSFET; and further comprising a voltage divider circuit, and a pulse width modulation (PWM) IC, and said voltage divider circuit being coupled to said rectify/filter circuit of an input terminal of said power supply device, and said voltage divider circuit coupled to said pulse width modulation (PWM) IC being controlled by an over voltage (OVRV) of said PWM IC, and said voltage divider circuit being capable of sending said AC power supply voltage of said rectify/filter circuit to said PWM IC, so that when said OVRV voltage exceeds a predetermined value due to an excessively high AC power supply, said OVRV turns off said MOSFET to protect said power supply device from being damaged by high voltage.

4. A power supply device for outputting stable programmable power supply, comprising a rectify/filter circuit, a transformer, a secondary filter circuit, and a DC output terminal;

said rectify/filter circuit being coupled to an AC power supply and comprised of a capacitor and an inductor to constitute a full wave rectify circuit for rectifying and filtering said AC power supply to obtain a stable DC power supply, and said transformer being coupled to said rectify/filter circuit to reduce the voltage of said DC power supply after being rectified and filtered, and to output a direct current from said DC output terminal after a secondary filter by said secondary filter circuit;

wherein said power supply device comprises a clamp circuit, and said clamp circuit is coupled to a Another Aspect Circuit of said transformer, such that said clamp circuit reduces a high voltage produced when a MOSFET is turned off and releases energy of said transformer caused by a magnetic leakage and an induction and then stored in said transformer, thereby reducing the high voltage borne by said MOSFET and enhancing the reliability of said MOSFET; and further comprising a buffer circuit comprised of a capacitor and a resistor and a diode, and said buffer circuit being coupled to said MOSFET for preventing a purge caused by reversing a voltage direction when said MOSFET is turned off; and said buffer circuit cancels out said purge by charging said capacitor by said resistor; when said MOSFET is turned on, said diode is in forward bias voltage and discharges said capacitor to consume the energy of said purge to protect said MOSFET and reduce an electromagnetic interference signal.

* * * * *